July 27, 1965     H. F. SWENSON     3,196,627
AUTOMATIC MIX FEED SYSTEM FOR DISPENSING FREEZERS
Filed May 3, 1962
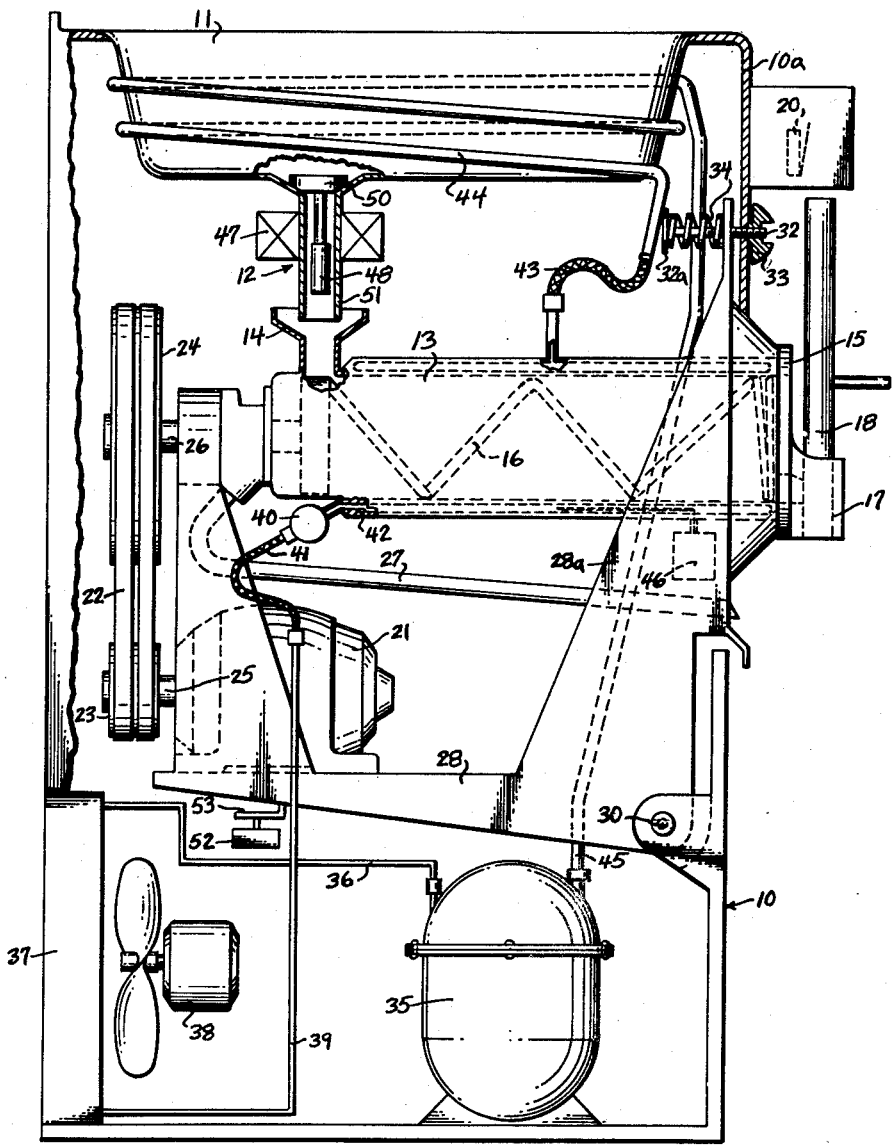
INVENTOR.
HARVEY F. SWENSON
BY
ATTORNEYS

United States Patent Office 3,196,627
Patented July 27, 1965

3,196,627
AUTOMATIC MIX FEED SYSTEM FOR DISPENSING FREEZERS
Harvey F. Swenson, Seattle, Wash., assignor to Sweden Freezer Manufacturing Co., Seattle, Wash., a corporation of Washington
Filed May 3, 1962, Ser. No. 192,200
8 Claims. (Cl. 62—136)

This invention relates to a dispensing freezer, and more particularly to a freezer which is arranged to carry mix for ice cream, frozen custard, slush ice, etc., and to freeze and dispense the same in individual servings.

In machines of this general nature, a freezing cylinder is initially charged with a suitable mix from a storage tank thereabove. Housed in the cylinder is a rotary dasher which serves both to agitate and whip air into the mix during the freezing thereof and to eject frozen mix when the cylinder outlet is opened by the operator moving a discharge gate. So that there may always be in the cylinder a ready supply of mix, properly whipped and frozen, it is desirable that when a portion of the frozen mix is dispensed, the cylinder be replenished with a charge of mix from the tank, the quantity of this charge being properly proportioned by the amount of the frozen mix dispensed so as to keep the supply in the cylinder fairly constant. Since predetermined charges of mix from the tank will, after being shipped and frozen in the freezing cylinder, probably vary somewhat in both density and viscosity, there are problems involved in metering the charge from the tank in relation to a predetermined volumetric size of serving or to a predetermined gate opening period.

Accordingly, the present invention aims to provide an improved control means for replenishing the freezing cylinder of a dispensing freezer which does not rely upon the above factors.

More particularly, the invention aims to provide a dispensing freezer which controls the amount of mix needed to replenish the freezing cylinder of the dispenser by making such control responsive to the weight of the servings dispensed. In carrying out this object, a further object is to provide a dispensing freezer so arranged that when a serving of frozen mix is dispensed from the freezing cylinder, the quantity of mix taken from the mix tank to replenish the supply in the cylinder is controlled in accordance with the weight of mix in the freezing cylinder, so that the supply of mix in the cylinder may be maintained at a predetermined weight level.

It is a further particular object of this invention to so arrange the dispenser with the mechanism which is responsive to the weight of mix in the cylinder, that the forces created by movement of the dasher in the cylinder and its associated drive motor do not effect the proper response of the mechanism.

It is also a specific object so to arrange the control mechanism that the freezing cylinder is movable responsive to weight changes in the mix therein and so that the response of the mechanism is dependent upon a predetermined amount of movement of the freezing cylinder in turn caused by change of weight of the mix in the cylinder.

The foregoing, with still additional objects and advantages in view, will appear and be understood in the course of the following description and claims, the invention consisting in the novel construction and in the adaptation and combination of parts hereinafter described and claimed.

In the accompanying drawing:

The one figure shown is a semi-schematic side elevational view showing a dispensing freezer embodying preferred teachings of my invention, the side wall of the freezer being cut-away so as to expose the working parts therein.

Numeral 10 designates a fixed frame which serves both as a supporting and containing structure for the apparatus, and which carries at its upper end a tank 11 containing a supply of mix. This mix passes by gravity flow through an electrically operated valve 12 into a freezing cylinder 13 by way of a funnel-like inlet 14 at the upper rear portion of the cylinder, the inlet being exposed to the atmosphere so that air may pass into the cylinder along with the mix. Housed in the cylinder and having a journal mounting at the rear thereof and in a removable cover plate 15, is a rotary dasher 16, which serves to scrape the mix from the inner surface of the cylinder and to whip air into the mix as it is being frozen in the cylinder.

Frozen mix is discharged through a cylinder outlet 17 in the cover 15 responsive to raising of a discharge gate 18. The lifting of this gate causes a normally open switch 20 to close so as to activate an electric motor 21 which in turn drives the dasher 16. The forward portion of the dasher 16 is auger shaped to urge the frozen mix through the cylinder outlet at a proper rate of discharge. The transmission of power from the motor 21 to the dasher 16 is performed by belts 22 acting on a pair of pulley wheels 23–24, which are keyed, one to the drive shaft 25 of the motor and the other to the dasher drive shaft 26. The latter is provided with a suitable removable mix seal at the rear of the freezing cylinder, and a drain tube 27 leading from the rear of this seal may be provided for use when the cylinder 13 is flushed during cleaning thereof.

Both the freezing cylinder 13 and the motor 21 are rigidly secured to a cradle 28 which is mounted on the main supporting frame 10 by trunnions 30 for swing movement about a transverse horizontal axis at the forward part of the cradle. It is important to understand that the collective center of gravity of the cradle 28 and the structure (motor 21, cylinder 13, dasher 16, gate 18, etc.) carried thereby is offset horizontally from its swing axis, and namely to the rear thereof in the illustrated embodiment. Furthermore, the rotary axes of both the dasher 16 and the motor 21 are parallel and disposed in the fore-and-aft direction of the machine so that these axes are perpendicular to a plane containing the swing axis of the cradle.

The tendency of the cradle 28 to swing downwardly about the trunnions 30 by force of gravity is yieldingly resisted by an adjustable spring mechanism 31. This mechanism comprises a stud 32 which has its threaded shank extending forwardly through the top of an upstanding cylinder supporting portion 28a of the cradle 28 and then through the front wall 10a of the fixed frame 10, where it threadably receives an adjusting knob 33. The rearwardly positioned head 32a of the stud serves as a seat for a compression spring 34 sleeved onto the stud and bearing against the rear face of the upstanding cradle extension 28a while the rear of the knob 33 bears against the front face of the wall 10a. Thus, by adjusting the knob 33 it is possible to vary the preload on the spring 34 and thereby select the lifting force exerted by the spring on the cradle 28.

The refrigerating mechanism for the freezer is conventional and comprises a motor-driven compressor 35 which feeds refrigerant under pressure through a tube 36 to a condsenser 37 provided with an electric fan 38. Carrying the refrigerant from the condenser is a tube 39 which connects to an expansion valve 40 through a flexible tube portion 41. The expansion valve discharges into an evaporator 42 which is arranged, jacket fashion, about the freezing cylinder 13. The refrigerant passes from the evaporator through a second flexible tube 43, through a set of cooling coils 44 circumscribing the mix tank 11, and thence through a return tube 45 to the compressor 35. The refrigerating mechanism is controlled by a thermostat, indicated schematically at 46, which, in response to the effect of the temperature of the mix in the cylinder 13, activates not only the compressor 35, but also the motor 21 to rotate the dasher 16.

The feed valve 12 may be of the type described in my issued Patent #2,737,024, and comprises a solenoid 47, which, when energized, lifts a core member 48 to raise a tapered valve plug 50 attached thereto so as to allow mix to flow downwardly through a depending feed tube 51 into the cylinder inlet 15. Shown schematically at 52 is a self-closing switch which is fixed to the frame 10 and is wired with the solenoid 47 to activate the latter and lift the feed valve 12 to an open position while the switch is closed. Opening of the switch is accomplished by an arm 53 which projects from the lower end of the cradle 28 in such a manner, that when the cradle swings downwardly a predetermined amount the arm engages the switch 52 to deenergize the solenoid and permit the feed valve plug to drop closed.

In operation, the knob 33 is set at a position selected in accordance with the desired weight of mix which is to be maintained in the freezing cylinder 13. Initially, with no mix in the freezing cylinder, the cradle 28 will lift by action of the spring 34 sufficiently to raise the arm 53 free of the switch 52 to allow the switch to close and energize the solenoid 47 so as to open the feed valve 12. As mix flows into the freezing cylinder, the weight of the mix in the cylinder increases and the cradle 28 responsively lowers at the rear against the force of the spring 34. When the cradle drops the predetermined amount, the switch 52 is caused to open by action of the arm 53 thereagainst, thereby freeing the valve plug 50 to drop and close the feed valve 12. As frozen mix is thereafter dispensed from the cylinder by lifting the gate 18, the weight of mix in the cylinder is of course correspondingly decreased, so that the spring 34 will, upon a predetermined weight loss in the cylinder, rock the cradle upwardly to a level freeing the self-closing switch 52 so as to activate the solenoid and lift the feed valve plug 50 to open position.

It should be noted that the motor 21 will periodically switch on and off responsive to dasher operating requirements and create inertial forces by the angular acceleration and deceleration of the motor, dasher 16 and related parts. However, these forces are purposely directed in planes which are parallel with the swing axis of the cradle 28 and thus will not exert any torque on the cradle tending to rotate it about its swing axis. By this arrangement movement of the cradle is maintained in direct response to the weight of the mix in the freezing cylinder 13.

It is believed that the invention will have been clearly understood from the foregoing description of my now-preferred illustrated embodiment. No limitation are to be implied, the intention being that the hereto annexed claims be given the broadest interpretation to which the employed language fairly admits.

What I claim, is:

1. In a dispensing freezer, a cradle assembly including a freezing cylinder which has an inlet for liquid product and a gate-controlled outlet for discharging frozen product, a motor-driven rotary dasher in said cylinder exerting a torque, means for mounting said cradle assembly for swinging movement relative to a swing axis which is parallel to the plane in which said torque is exerted and offset from the center of gravity of said cradle assembly, means yieldingly resisting said swinging movement, and means for supplying liquid product to said inlet when said cradle assembly has swung a predetermined amount responsive to a respective weight reduction in cylinder contents below a given amount as a consequence of dispensing frozen product from said outlet.

2. In a dispensing freezer, a cradle, structure carried by said cradle including a freezing cylinder having an inlet for liquid product and a gate-controlled outlet for discharging frozen product, a rotary dasher in said cylinder, and a motor operatively interconnected with said dasher, means for mounting said cradle for swinging movement about a swing axis which occupies a plane perpendicular to the rotary axis of said dasher and offset from the collective center of gravity of said cradle and the structure carried thereby, means yieldingly resisting said swinging movement, and means for supplying liquid product to said inlet when said cradle has swung a predetermined amount responsive to a respective weight reduction in cylinder contents below a given amount as a consequence of dispensing frozen product from said outlet.

3. In a dispensing freeler, a cradle, structure carried by said cradle including a freezing cylinder and having an inlet for liquid product and a gate-controlled outlet for dispensing discharge product, a rotary dasher in said cylinder, and a motor operatively interconnected with said dasher, the location of said motor and said dasher being such that the inertial forces caused by the acceleration and deceleration of said dasher and motor are directed in a predetermined plane, means for mounting said cradle for swinging movement about a swing axis which is constantly parallel to the plane of said inertial forces, said swing axis being offset from the collective center of gravity of said cradle and the structure carried thereby, means yieldingly resisting said swinging movement, and means for supplying liquid product to said inlet when said cradle has swung a predetermined amount responsive to a respective weight reduction in cylinder contents below a given amount as a consequence of dispensing frozen product from said outlet.

4. In a dispensing freezer, a cradle, a freezing cylinder mounted on said cradle and having an inlet for liquid product and a gate-controlled outlet for dispensing discharge product, a rotary dasher in said cylinder, a motor carried by said cradle and operatively interconnected with said dasher, means for mounting said cradle for swinging movement about a swing axis, the rotary movement of said motor being about an axis perpendicular to a plane containing said swing axis, the rotary movement of said dasher also being about an axis which is perpendicular to a plane containing said swing axis, so that the inertial forces created by the acceleration and deceleration of said motor and said dasher will not tend to cause rocking movement of said cradle about said swing axis, means yieldingly resisting said swinging movement, and means for supplying liquid product to said inlet when said cradle has swung a predetermined amount responsive to a respective weight reduction in cylinder contents below a given amount as a consequence of dispensing frozen product from said outlet.

5. In combination, a fixed support, a swing frame mounted for swing movement about said support, a freezing cylinder mounted on said frame and having an inlet for liquid product and a gate-controlled outlet for dispensing discharge product, a rotary dasher in said cylinder, a motor carried by said frame and operatively interconnected with said dasher, means for mounting said frame on said support for swinging movement about a swing axis, the rotary movement of said motor being about an axis perpendicular to a plane containing said swing axis, the rotary movement of said dasher also being about an axis which is perpendicular to a plane containing said swing axis, so that the inertial forces created by the acceleration and deceleration of said motor and said dasher will not tend to cause any of said swing movement of said frame, spring means seated on said support to yieldingly resist said swing movement, a storage tank free of said frame to contain a quantity of said liquid product, a normally-closed electrically operated valve means operatively connected to said storage tank, and which, when opened, permits liquid product to flow from said tank into said cylinder inlet, a normally-open control switch free of said frame and arranged to be closed when said frame swings to a predetermined position in response to a decrease of weight of said liquid product in said cylinder, the closing of said switch causing the opening of said valve to replenish said cylinder with liquid product whereupon the increase of weight in said cylinder moves said frame to another predetermined position to open said switch.

6. The structure of claim 5 in which a compressor and condenser are mounted free of said swing frame and are iterconnected for the passage of refrigerant from the compressor to the condenser, and tube means including flexible tube sections operatively interconnecting said compressor and condenser with said freezing cylinder.

7. The device as recited in claim 6, wherein the loading of said spring means is adjustable.

8. In combination, a fixed support, a swing frame mounted for swing movement about said support, a freezing cylinder mounted on said frame and having an inlet for liquid product and a gate-controlled outlet for dispensing discharge product, a rotary dasher in said cylinder, a motor carried by said frame and operatively interconnected with said dasher, means for mounting said frame on said support for swinging movement about a swing axis, the rotary movement of said motor being about an axis perpendicular to the plane containing said swing axis, the rotary movement of said dasher also being about an axis perpendicular to a plane containing said swing axis, so that the inertial forces created by the acceleration and deceleration of said motor and said dasher will not tend to cause any of said swing movement of said frame, spring means seated on said support to yieldingly resist said swing movement, a storage tank free of said frame to contain a quantity of said liquid product, a normally-closed valve means operatively connected to said storage tank, and which, when opened, permits liquid product to flow from said tank into said cylinder inlet, control means free of said frame for opening said valve means when said frame swings to a predetermined position in response to a decrease of weight of said liquid product in said cylinder to replenish said cylinder with liquid product and for then closing said valve means when the increase of weight in said cylinder returns said frame to another predetermined position.

References Cited by the Examiner
UNITED STATES PATENTS

| | | | |
|---|---|---|---|
| 749,286 | 1/04 | Gerner | 62—342 |
| 1,056,487 | 3/13 | Bastian | 256—26 |
| 2,730,865 | 1/56 | Murdock | 62—347 |
| 2,760,344 | 8/56 | Oltz | 62—136 |
| 2,777,393 | 1/57 | Woodruff. | |
| 2,827,773 | 3/58 | Detjen | 62—135 |
| 2,891,385 | 6/59 | Nelson | 62—137 |
| 2,924,952 | 2/60 | Swenson et al. | |
| 2,968,166 | 1/61 | Baker | 62—137 |
| 2,994,205 | 8/61 | Brubaker | 62—137 |
| 3,003,327 | 10/61 | Cox | 62—347 |

ROBERT A. O'LEARY, *Primary Examiner.*

MEYER PERLIN, *Examiner.*